(12) United States Patent
Amato

(10) Patent No.: US 10,346,891 B2
(45) Date of Patent: Jul. 9, 2019

(54) SYSTEM AND METHOD FOR PREDELIVERY NOTIFICATION USING MAIL IMAGE

(75) Inventor: Michael J. Amato, Reston, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 2339 days.

(21) Appl. No.: 10/474,435

(22) PCT Filed: Apr. 9, 2002

(86) PCT No.: PCT/US02/11060
§ 371 (c)(1),
(2), (4) Date: Oct. 9, 2003

(87) PCT Pub. No.: WO02/082225
PCT Pub. Date: Oct. 17, 2002

(65) Prior Publication Data
US 2004/0139033 A1  Jul. 15, 2004

Related U.S. Application Data

(60) Provisional application No. 60/282,158, filed on Apr. 9, 2001.

(51) Int. Cl.
*G06Q 30/06* (2012.01)
*G06Q 10/08* (2012.01)
*G06Q 30/02* (2012.01)

(52) U.S. Cl.
CPC .......... *G06Q 30/06* (2013.01); *G06Q 10/083* (2013.01); *G06Q 30/0283* (2013.01)

(58) Field of Classification Search
CPC .......................... G06Q 30/06; G06Q 10/083
See application file for complete search history.

(56) References Cited

U.S. PATENT DOCUMENTS

| 4,632,252 A | 12/1986 | Haruki et al. |
| 4,800,506 A | 1/1989 | Axelrod et al. |
| 5,031,223 A * | 7/1991 | Rosenbaum et al. ......... 382/101 |
| 5,308,932 A | 5/1994 | Manduley et al. |

(Continued)

FOREIGN PATENT DOCUMENTS

| EP | 1 063 602 A1 * | 12/2000 | ............. G06F 17/60 |
| EP | 1063602 A1 | 12/2000 | |

(Continued)

OTHER PUBLICATIONS

Edge, on & about AT&T, "Snailmail upgrade: U.S. Postal Service selects Retix ROUTERXchange 7000 for nationwide mail sorting network; $5 million 200-site multimedia network will help speed the delivery of hundreds of millions of mail pieces daily," 10.n345, Edge Publishing, Mar. 6, 1995, p. 23(1).*

(Continued)

*Primary Examiner* — Nathan Erb
(74) *Attorney, Agent, or Firm* — Finnegan, Henderson, Farabow, Garrett & Dunner, LLP

(57) ABSTRACT

A method and system is provided for notifying an addressee about a mail piece having an address. The system captures an image of the mail piece and determines a communication channel for the addressee using the address from the mail piece. The system provides the addressee with the image via the communication channel.

28 Claims, 2 Drawing Sheets

(56) References Cited

U.S. PATENT DOCUMENTS

| | | | |
|---|---|---|---|
| 5,315,668 A * | 5/1994 | O'Hair | 382/159 |
| 5,422,821 A | 6/1995 | Allen et al. | |
| 5,535,127 A * | 7/1996 | Uno et al. | 705/406 |
| 5,563,947 A | 10/1996 | Kikinis | |
| 5,619,648 A | 4/1997 | Canale et al. | |
| 5,917,925 A * | 6/1999 | Moore | 382/101 |
| 6,052,709 A | 4/2000 | Paul | |
| 6,189,223 B1 * | 2/2001 | Haug | 33/1 V |
| 6,216,122 B1 | 4/2001 | Elson | |
| 6,285,777 B2 | 9/2001 | Kanevsky et al. | |
| 6,292,709 B1 | 9/2001 | Uhl et al. | |
| 6,459,953 B1 * | 10/2002 | Connelly et al. | 700/224 |
| 6,690,773 B1 | 2/2004 | Law | |
| 6,931,388 B2 * | 8/2005 | Robbins | 707/1 |
| 2001/0035458 A1 * | 11/2001 | Schum et al. | 235/462.08 |
| 2001/0049624 A1 | 12/2001 | Uyama et al. | |
| 2002/0029202 A1 * | 3/2002 | Lopez | 705/406 |
| 2002/0032623 A1 * | 3/2002 | Wheeler et al. | 705/28 |
| 2002/0095306 A1 * | 7/2002 | Smith et al. | 705/1 |
| 2002/0120600 A1 | 8/2002 | Schiavone et al. | |
| 2002/0120702 A1 | 8/2002 | Schiavone et al. | |
| 2002/0131561 A1 * | 9/2002 | Gifford et al. | 379/67.1 |
| 2002/0143428 A1 | 10/2002 | Sansone | |
| 2002/0143430 A1 * | 10/2002 | Sansone et al. | 700/226 |
| 2002/0149195 A1 * | 10/2002 | Beasley | G09F 3/00 283/71 |
| 2003/0167244 A1 | 9/2003 | Rasmussen et al. | |
| 2003/0182265 A1 * | 9/2003 | Robbins | B42D 15/006 |
| 2004/0117326 A1 | 6/2004 | Amato | |
| 2004/0139033 A1 | 7/2004 | Amato | |

FOREIGN PATENT DOCUMENTS

| | | |
|---|---|---|
| JP | 63-294156 | 11/1988 |
| JP | 10-307876 | 11/1998 |
| WO | WO 98/37680 | 8/1998 |
| WO | WO 99/14909 | 3/1999 |
| WO | WO 99/21330 | 4/1999 |

OTHER PUBLICATIONS

Mijares, Richard, Analysis and Application of Intensity Modulated Fiber Optic Sensor as POSTNET Bar Code Reader, University of Nevada Reno, Aug. 1997.*

Carroll, J. "E-mail Message Filtering Software Set to Explode. (E-Mail) (Column)", Computing Canada, vol. 19, No. 16, pp. 46(1), pp. 1-3, (Aug. 3, 1993).

Newsbytes News Network, "Internet Expo—Pronto Mobile & 'Secure' E-Mail (CommTouch Software's New E-mail Client for Portable PC Users, Pronto Mobile, Provides Time-Saving New 'Scenarios')", Newsbytes News Network, pp. 1-3, (Dec. 4, 1995).

Office Action dated May 25, 2007, in co-pending U.S. Appl. No. 10/474,251 (13 pages).

Final Office Action dated Feb. 21, 2008, in co-pending U.S. Appl. No. 10/474,251 (11 pages).

Office Action dated Aug. 6, 2008, in co-pending U.S. Appl. No. 10/474,251 (13 pages).

Final Office Action dated Feb. 19, 2009, in co-pending U.S. Appl. No. 10/474,251 (12 pages).

Final Office Action dated Nov. 12, 2009, in co-pending U.S. Appl. No. 10/474,251 (12 pages).

Final Office Action dated Jun. 23, 2010, in co-pending U.S. Appl. No. 10/474,251 (11 pages).

* cited by examiner

SYSTEM AND METHOD FOR PREDELIVERY NOTIFICATION USING MAIL IMAGE

CROSS-REFERENCE TO RELATED APPLICATIONS

This application is based upon and claims the benefit of priority from U. S. Provisional Application No. 60/282,158 by Michael J. Amato, filed Apr. 9, 2001, the contents of which are expressly incorporated herein by reference.

FIELD

The present invention relates to notification regarding delivery of a mail piece. More particularly, the invention relates to methods and systems for notifying an addressee that a mail piece has been, or is about to be, delivered by providing the addressee with an image of the mail piece.

BACKGROUND

Currently, delivery services, such as the United States Postal Service (USPS), provide mail delivery service to customers or "addressees". The delivery services provide a wide range of delivery options, such as delivery to home addresses, delivery to business addresses, and delivery to mail boxes located at central offices such as post offices. For example, the United States Postal Service (USPS) has 16 million Post Office (PO) boxes rented to customers ("holders"). Typically, when mail pieces arrives at a post office, a delivery service worker merely "cases" the mail pieces (i.e. places the mail pieces in the appropriate mail box or prepares the mail pieces for delivery to other locations, such as a home and business addresses) without notifying the addressee. A mail piece may be any type of correspondence handled by a delivery service, such as letters, packages, flats, catalogs, postcards, etc. In this situation, the addressee is unaware of the contents of their mail box or mail pieces en route until they check their mail boxes at the post offices or the mail piece is delivered to their home or business. The conventional addressee must therefore manage their mail boxes physically and in person.

An addressee wastes time and transportation costs each time he or she makes a trip to the post office and finds that the mail box contains only standard, or low priority mail the holder would not have made a trip for, had he or she known the contents of the mail box. Many addressees do not want to go check their mail everyday; but instead only want to go when it contains something important, such as a check or other important documents. This is especially true if the addressee is not located conveniently near the post office because a lengthy trip involves much time, effort, and expense. In addition, unnecessary trips to the post office contribute to post office congestion. However, problems may occur when an addressee elects not to visit the post office to check their mail box, and the mail box contains an important time-sensitive mail piece, such as an overdue bill or a perishable item.

Likewise, an addressee has no method to determine what mail pieces are en route to their home or business address. An addressee may wish to know what type of mail pieces are en route to be delivered to locations, such as home and business mail boxes. This is especially true if the addressee is waiting to receive an important document, such as checks or perishable items. This may also cause problems for people who have mail pieces addressed to delivery addresses, such as a vacation home address, home address, or business address, during a period that they are away.

One proposed solution to some of the problems of mail management uses the PLANET code™ of the USPS, which is an applied barcode that uniquely identifies mail pieces from certain mailers. The PLANET code™ may be used to track a mail piece. That is, by submitting an inquiry, an addressee may track the current location of a PLANET-coded mail piece, and determine the mailer. This method requires that the addressee know each mailer to whom a PLANET code™ is assigned. Another proposed PLANET code™ solution, described in U.S. Provisional Patent Application No. 60/239,926, entitled Flexible Parcel Delivery System and Method, inventors Edward J. Kuebert, Scott R. Bombaugh, and William J. Dowling, filed Oct. 13, 2000, uses the PLANET code™ information to notify addressees that a mail piece is in transit.

However, to use this tracking capability, an addressee must know that the mail piece actually contains a PLANET code™, as well as other information such as the PLANET code™ number. In addition, only a limited number of large volume mailers use a PLANET code™, so PLANET-code-based systems are limited to a small subset of all mail pieces. Thus, an addressee generally cannot determine what mail pieces are in his PO box or other delivery point; he can only find out about a limited subset of PLANET coded mail. Further, this method requires that, the delivery service somehow associate the PLANET code™ with the mailer's name, address, and other notification information. This method involves centralized database lookups, and, as noted, only applies to a large volume mailers who are participating in the PLANET code™ program.

Another proposed solution to some of the disadvantages of mail management is the "E-box Check" system of the USPS. E-box Check allows a user to go to a website and gain some information regarding mail pieces delivered at, or en route to, their mail box. The E-Box Check system is described further in U.S. Provisional Patent Application No. 60/245,670, entitled Remote Mailbox Management System and Method, inventor Ronald Garey, filed Nov. 6, 2000.

However, E-box Check provides limited information about mail pieces; typically, the number of mail pieces and the mail class of each mail piece in a mail box. For a subset of mail pieces that have a PLANET code™, E-box Check can also provide sender identification information. E-box Check requires adding equipment and/or human processing to the existing conventional delivery system. For example, either sensors (or other per-mail-box apparatuses) are needed to determine that a mail piece is in a mail box, or a postal worker must "wand" a mail tray to notify the E-box Check system that the mail has been cased.

Yet another proposed solution to some of the disadvantages of mail management is the USPS's Reply Card Notification (RCN) system. The RCN system supplies an image of the back of a reply postcard (e.g., a card to purchase compact discs from Columbia House Records Co.), to the addressee. In the RCN system, the cards are first sorted conventionally, which segregates all the cards for a specific addressee. Then, the cards are rerun backwards through the existing sorting machinery in order to capture an image of the information on the back. The image is supplied to the addressee.

However, in this method, it is difficult and inefficient to run the cards backwards through existing machinery. Putting cameras on both sides to solve this problem may also increase the cost of the system. Also, the RCN service may only be provided to a very few specific addressees—addressees who received a specific type of reply postcards containing information from customers. Further, the USPS may not provide assurance that images of all the cards had been provided. Due to the business nature of the information in the image, an extremely high readability rate, approaching 100 percent, may be required by the addressee.

Accordingly, a need exists for systems and methods that efficiently and cheaply provide an addressee with information about the mail pieces en route to, or already delivered to, the addressee's delivery point, particularly an addressee's mail box. A need exists for systems and methods that efficiently make use of existing, in-place postal handling equipment to provide the information to the addressee. Needed are systems and methods that supply information concerning a large percentage of the mail pieces handled by a delivery service, not merely a subset of mail pieces with certain delivery-service-applied codes.

SUMMARY

According to the present invention, an image of a mail piece that is en route to a delivery address, or that has already arrived at an address (such as a PO box) is provided to the addressee. The invention uses electronic images to notify an addressee that a mail piece is en route or has arrived. The image of the mail piece provides to the addressee all the information available from a visual inspection the mail piece. Based on the mail piece image, an addressee can better manage his or her mail. In one aspect, the invention gives an addressee the ability to actually view the contents of their mail box from a front-of-the-letter standpoint, without requiring the addressee to physically visit the post office or wait for the mail piece to arrive.

Systems and methods consistent with the principles of the present invention provide information so that addressee, such as PO Box holders, can wisely decide whether or not to visit the post office and retrieve the mail pieces in his or her mail box. For example, an addressee could avoid unnecessary trips to the post office when their mail box is empty. Similarly, an addressee could make a special trip to the post office as soon as an eagerly anticipated mail piece, such as a check or a package from a catalog company, is delivered. Also, an addressee can determine what type of mail pieces are en route to specific delivery addresses.

Systems and methods consistent with the principles of the present invention also provide visual information revealing the condition of a mail piece in the possession of the delivery service. Thus, facts regarding when a mail piece was damaged and by whom can be more accurately determined.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate aspects consistent with the present invention and together with the description, serve to explain the principles of the invention.

DETAILED DESCRIPTION

Reference will now be made in detail to specific exemplary aspects consistent with the present invention. Wherever possible, the same reference numbers will be used throughout the description to refer to the same or like parts. The invention is described using certain aspects involving mail as handled by a delivery services such as the USPS. One of ordinary skill in the art will recognize, however, that the principles of the present invention apply to any type of shipping or delivery of objects or mail pieces from a sender to an addressee's delivery point.

A large percentage of the mail currently processed by delivery services, such as the USPS, is optically scanned, typically by capturing an image of the front of a mail piece. A mail piece may be any type of correspondence handled by a delivery service, such as letters, packages, flats, catalogs, postcards, etc. Existing sorting machines currently capture an image of a mail piece for the purpose of coding the mail piece (putting an actual barcode on it) for sorting. The image is processed by an Optical Character Reader (OCR), which converts the address information into a ZIP Code barcode. The ZIP Code barcode is "sprayed" (printed) on the bottom front right portion of the mail piece. Coded mail pieces are easier to sort, because subsequent machines only have to read and decode the barcode (without going through the OCR process) in order to route the mail piece to the addressed destination.

Currently, the mail piece images are discarded after a barcode is successfully applied. Systems and methods consistent with the principles of the present invention, however, use the image of a mail piece to electronically notify the addressee that a mail piece is currently in a specific location, such as the addressee's PO box or en route to a delivery location.

Figure 1:
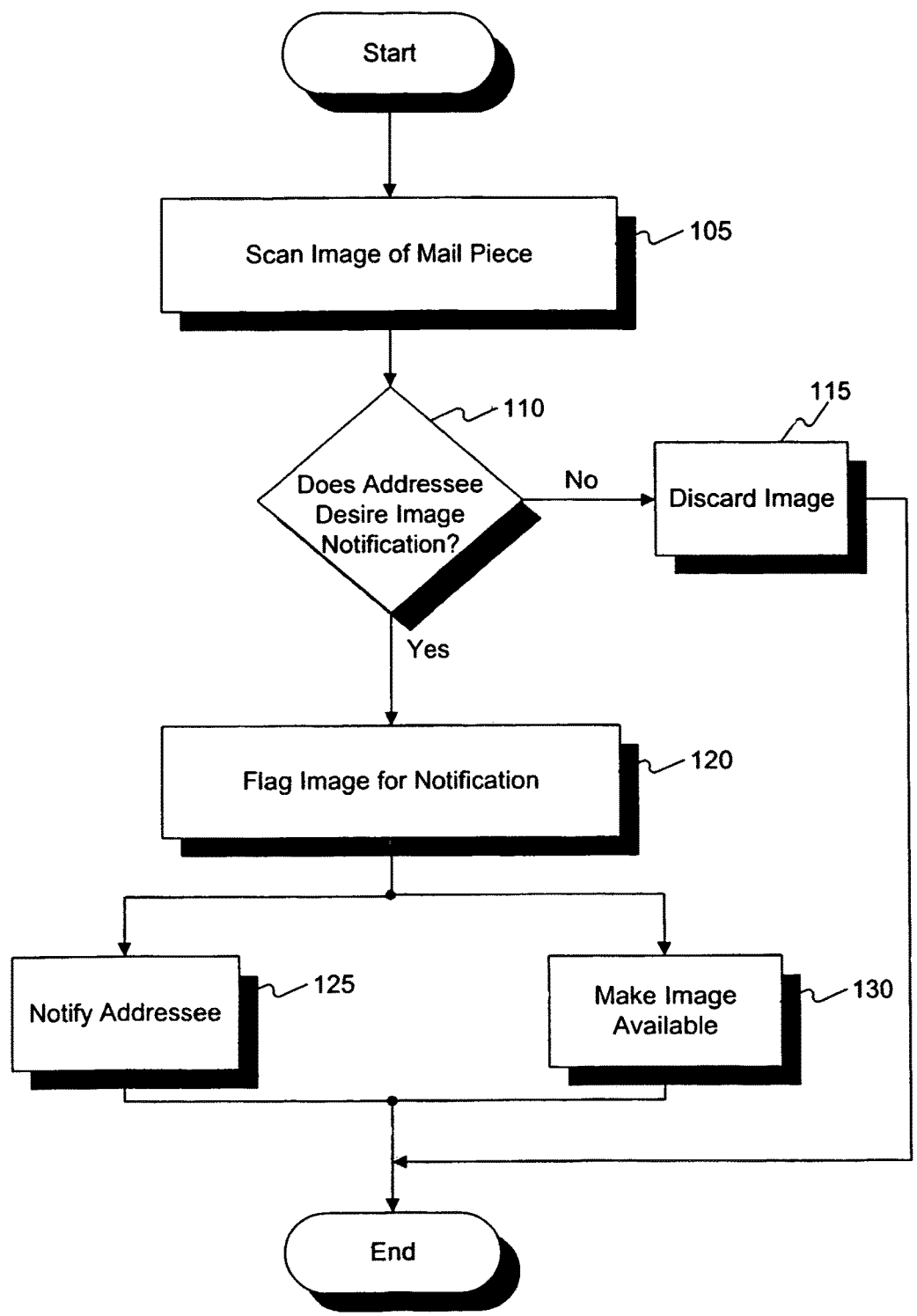
FIG. 1 is a flowchart of the stages of an exemplary process for notifying addresses with mail piece images, consistent with certain aspects of the present invention.

FIG. 1 is a flow chart illustrating an exemplary process for supplying an addressee with a mail image, consistent with certain aspects of the present invention. The process begins by scanning an image of a mail piece (stage 105). In some delivery services, such as the USPS, practically all incoming mail pieces are processed by an Input Sub System (ISS) with an OCR, which scans the front of each mail piece, thus capturing an image. The image may used only to code the mail piece with an equivalent ZIP Code barcode. After the OCR process determines the ZIP Code, the image may be disposed of. However, in this aspect the image is retained after the optical character reading process is complete.

In stage 110, the delivery service determines whether the addressee of the mail piece desires mail image notification. This stage may be performed by a computer system that accesses a database indexed by the address on the mail piece. If the database shows that the addressee of the mail piece has not signed up for image notification, then the mail piece image is discarded (stage 115) and the process ends.

If the database shows that the addressee has signed up for image notification, then processing proceeds to stage 120, and the image of the mail piece flagged for forwarding to the addressee.

In the next stages, which may be performed simultaneously, the delivery service both notifies the addressee by forwarding a copy of the image to the user (stage 125), and makes a copy of the image available for access by the user (stage 130). For example, notification may be achieved by forwarding a copy of the image to the addressee by email and a copy of the image may be placed on a website for later viewing by the addressee. One skilled, in the art, however, will quickly recognize that notification may be done by fax, cell phone, or via many other communication channels and need not include a copy of the image.

One of ordinary skill in the art will also recognize that the stages of the above process could be modified, deleted, or added to without departing from the scope of the present invention. For example, stages 125 and 130 could be modified such that a full-size image or a "thumb-nail" image is sent to the addressee and no image is made available on the website. The copy of the image transmitted to the addressee may be compressed to reduce the size of the image.

In a variation of the method, only images of mail pieces that are scanned during conventional mail handling may be made available for addressees. Alternately, the current conventional mail handling processes may be supplemented with additional imaging equipment for mail pieces that would not otherwise be imaged. For example, barcode sorters for presorted utility bills may be modified to capture an image of the entire mail piece.

In another variation during processing, an image may be gathered in the ordinary course of an initial sorting procedure, and then retained until the last sorting method immediately before the mail piece is delivered to its final addressed destination. Alternatively, the system may collect the image during the final sorting operation. Also, images may be collected and stored during each sorting operation the mail piece passes through.

In another variation, the stage of notification may include determining the character of the mail piece and notifying the addressee of the character. For example, the stage of notification may determine whether the mail piece is "flat mail" (i.e., an envelope) or a package.

Figure 2:
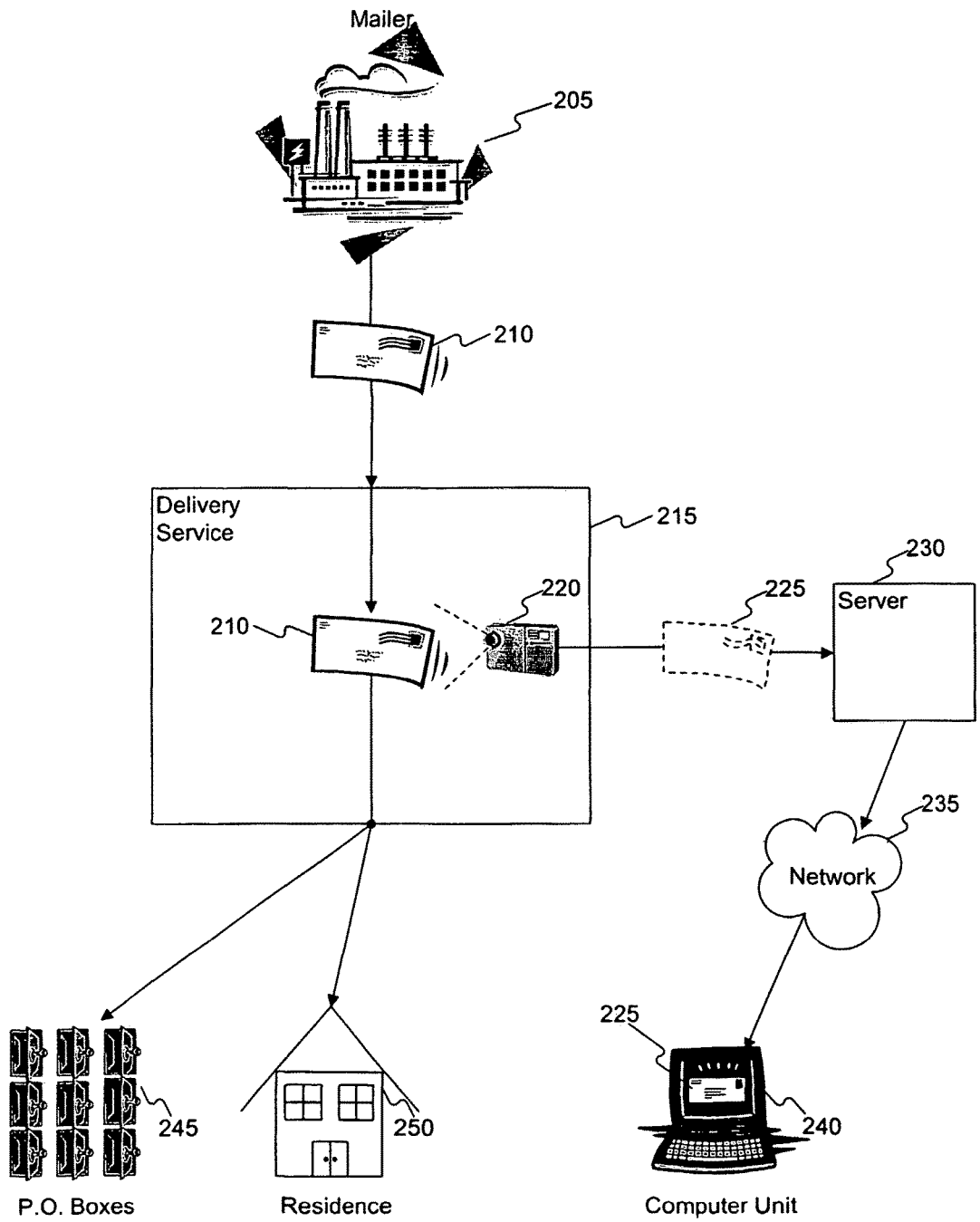
FIG. 2 is a diagram illustrating an exemplary system and flow of mail pieces consistent with certain aspects of the present invention.

FIG. 2 is a diagram illustrating an exemplary system and flow of mail pieces consistent with certain aspects of the present invention. FIG. 2 shows a mailer 205, such as a utility company, sending out a mail piece 210. A delivery service 215, for example the USPS, receives mail piece 210 and processes and sorts it for delivery to the address written on mail piece 210.

During processing by delivery service 215, an imaging unit 220 captures an image 225 of mail piece 210. Imaging unit 220 may be, for example, an OCR camera on a sorting machine that mail piece 210 passes through as part of the conventional sorting process.

For example, only images of mail pieces that are scanned during conventional mail handling are made available for addressees. The system may utilize images that are currently being captured by delivery service sorting equipment for other purposes. Likewise, the current conventional mail handling systems may be supplemented with additional imaging for mail pieces that would not otherwise be imaged. For example, the barcode sorters for the presorted utility bills just discussed could be modified to capture an image of the entire mail piece.

Image 225 may be gathered in the ordinary course of an initial sorting procedure, and then retained until the last sorting method right before the mail piece is delivered to its final addressed destination. Alternately, the system may collect image 225 during the final sorting operation. Also, images may be collected and stored during each sorting operation the mail piece passes through.

Image 225 may be provided in the form of a digital file encoded in a standard electronic image format, such as JPEG, TIFF, or GIF. Capturing, encoding, storing and transmitting digital images are all processes well known to those of ordinary skill in the art. For example, a digital scanner or digital OCR camera may capture the image and encode the image as a digital file.

Image 225 is sent to a server 230 for storage and display. Triggered by receipt of image 225, server 230 notifies the addressee located at computer unit 240 of mail piece 210 that the mail piece 210 is en route.

Server 230 may be a computer system that provides data, information, applications, images etc, via a network 235 to computer unit 240 at an addressee's location. Server 230 may contain standard components for inputting, outputting, manipulating, and storing data. For example, server 230 may comprise a central processing unit (CPU), random access memory (RAM), video card, sound card, magnetic storage devices, optical storage devices, input/output (I/O) terminals, and a network interface card (NIC) (all not shown). Furthermore, server 230 may be configured to perform processes and functions consistent with certain features of the present invention, such as image notification. Also, server 230 may comprise one or more storage devices that include information, such as addressee information and program and system data. The storage devices may also include instructions, applications, and processes that perform functions consistent with certain features related to the present invention.

Server 230 is configured to provide image notification and communicate with computer unit 240. The process may be configured in the form of a process created using various programming languages or software suites. For example, the mail notification process may be a program written in the Java™ programming language, hypertext markup language, or C programming language.

Computer unit 240 may contain standard components for inputting, outputting, manipulating, and storing data. For example, the computer unit may comprise a central processing unit (CPU), random access memory (RAM), video card, sound card, magnetic storage devices, optical storage devices, input/output (I/O) terminals, and a network interface card (NIC) (all not shown). Computer unit 240 may optionally be connected to a printer (not shown) through the I/O terminals. Examples of the I/O terminals to which the printer may be connected are parallel, serial, universal serial bus, and IEEE 1394.

Computer unit 240 is connected to server 230 through a network 235. For example, network 235 may be a local area network (LAN) or wide area network (WAN), such as the Internet, or wireless network.

Computer unit 240 is configured to receive mail notification, view mail images, and communicate with server 230. The process may be configured in the form of a process created using various programming languages or software suites. For example, the mail notification receiving process may be a program written in the Java™ programming language, hypertext markup language, or C programming language.

Several different methods may be used to notify the addressee of the image. In one method, notification may be done via email to the addressee's personal computer 240. In the case of email notification, the addressee located at computer unit 240 receives the email notification from server 230 transmitted across network 235. The addressee's email address is obtained from the addressee when he or she signs up for an image notification service consistent with the present invention and is stored in a database (not shown) indexed by the delivery address. Delivery service 215 creates a database entry linking the addressee's address, as would be found on a mail piece 210, to the email address provided. When delivery service 215 receives a mail piece, it accesses the database, finds the addressee's email address based on the address of the mail piece, and emails notification to the addressee.

Other channels of communication, such as fax, pager, etc. could be used for notification. The database may hold information on more than one type of communication channel and one or many channels could be used to notify an addressee. Notification preferably includes a description of the location of the mail piece at a specified time, such as: in Los Angeles, Calif. airport at 3 a.m. Oct. 20, 2000, or in PO box 1234, Merrifield, Va., at 2 p.m. Oct. 22, 2000. Server 230 may also use the delivery address on mail piece 210 to find the addressee's email address in the database.

Alternately, delivery service 215 may supply an email address to an addressee who signs up for the image notification service. For example, delivery service 215 makes available an email login account and address, accessible through a website, much like Yahoo!® email and Excite$^{SM}$ email. The email account is used for notification. Also, delivery service 215 may provide every addressee in the United States an email address based on every physical address in the country. Thus, every addressee who signed up for the image notification service would already have an email address known to delivery service 215.

Likewise, server 230 may use an OCR process on image 225 to determine the delivery address. Also, image 225 may include a ZIP Code barcode applied after an OCR process during conventional sorting, and server 230 decodes the barcode to determine the delivery address. Also, delivery service 215 may send the delivery address of mail piece 210 along with image 225 of mail piece 210, and server 230 uses the delivery address sent. After finding the addressee's email address, server 230 emails a message notifying the addressee about mail piece 210.

In another method of notification, the addressee may view image 225 as an attachment to the notification email. In this method, the addressee located at computer unit 240 receives the email notification from server 230 transmitted across network 235. The addressee views image 225 by accessing the attachment to the email. The addressee may also store image 225 on a local storage device.

In another method of notification, the addressee located at computer unit 240 may receive the email notification from server 230 transmitted across network 235. In this case, the email may contain a link to a file containing image 225 stored at a server 230, and the addressee connects to the server via network 235 to view image 225. For example, image 225 may be stored as a html web page and the addressee may access image 225 using a web browser installed on computer unit 240.

Meanwhile, delivery service 215 routes mail piece 210 to the addressed destination, such as a PO box 245 or a residence 250.

In the above system, server 230 was described as being remotely located from delivery service 215. One skilled in the art would realize that server 230 may be located at delivery service 215. One skilled in the art would also realize that server 230, located at delivery service 215 may also perform other functions related to mail piece processing, such as OCR processing on the mail pieces.

In email notification methods described above, an addressee receives an email message notifying him or her that a mail piece is their PO box. the email may include a thumbnail-size image of the mail piece or a full size image. Likewise, a thumbnail-size image of the mail piece or a full size image may be stored on server 230.

Further, one skilled in the art would realize that the imaging of the mail piece by the system illustrated in FIG. 2 may occur at any time during the mail piece delivery process. For example, an addressee is not notified with a mail piece image 225 until mail piece 210 is delivered to its address destination, such as a PO box 245 or residence 250. The notification is triggered by the last sorting operation that takes place before mail piece 210 is delivered to its addressed destination. When mail piece 210 hits the last sort, or at a predetermined time afterward, the addressee is notified. Likewise, image notification may be preformed each time mail piece 210 passes through a sorting machine en route from a sender 205 to its address destination. Thus, the addressee can track mail piece 210 in transit to P.O. boxes 245 or residence 250.

For example, consider a system consistent with the present invention that emails to a PO box holder images of the mail pieces recently delivered to his or her PO box. The PO box renter views an image of a first-class letter from General Electric Utilities of Macon, Ga.; an image of a bulk-class catalog from Shopper's Food Warehouse, and an image of a small parcel from the United States Mint in Philadelphia, Pa. By looking at these images, the PO box renter can make an informed decision on whether to spend the time and money to make a trip to the post office to retrieve these mail pieces, or whether to wait until additional mail pieces are delivered before going to the post office.

For another example, consider a system consistent with the present invention that emails to an addressee a message telling him to access a specified website for information concerning a mail piece en route to his or her home. Upon accessing the website, the addressee is presented with the image of a first-class letter that is en route to his or her home from Gray Investment Corp. of Alameda, Calif. The addressee also learns that the image was taken by sorting equipment in the Los Angeles Airport on that same day. Expecting a check from Gray Investment Corp. and based on the image information, the addressee goes home at lunch the next day to pick up his or her mail, so that the check can be deposited without delay.

Other embodiments of the invention will be apparent to those skilled, in the art from consideration of the specification and practice of the invention disclosed herein. For example, one skilled in the art would realize that the principles of the present invention encompass delivery services that sort mail pieces completely manually, but could use a digital camera solely for the purpose of capturing images to use for notifying addressees. It is intended that the specification and examples be considered as exemplary only, with a true scope and spirit of the invention being indicated by the following claims.

What is claimed is:

1. A method comprising:
performing a first sorting operation on an item having an address for an addressee;
during the first sorting operation:
capturing a first image of information available from a visual inspection of the item, the first image including the address,
based on the first image, recognizing the address and causing a barcode to be applied to the item, the barcode comprising an indication of the address, and
storing the first image in a database indexed by the address;
performing a second sorting operation on the item;
during the second sorting operation:

capturing a second image of the information available from the visual inspection of the item, the second image including the address and the barcode, based on the second image, decoding the barcode to determine the address, and storing the second image in the database indexed by the address;

based on the address, determining from the database a communication channel linked to the address;

sending a notification for the item via the communication channel; and discarding the first image and the second image prior to a delivery of the item.

2. The method of claim 1, wherein the item is a mail piece.

3. The method of claim 1, wherein capturing the first image includes:

capturing a digital image of the item and processing the digital image using an Optical Character Reader system.

4. The method of claim 1, wherein determining the communication channel includes:

looking up an email address linked to the address in the database.

5. The method of claim 1, wherein sending the notification includes:

sending an email that includes the second image as an attachment.

6. The method of claim 1, wherein sending the notification includes:

sending an email that includes a website address to access the second image.

7. The method of claim 1, further including:

determining a sender from at least one of the first image and the second image.

8. The method of claim 1, wherein the notification includes a physical location of the item.

9. The method of claim 8, wherein the notification further includes a time when the item was located at the physical location.

10. The method of claim 1, wherein sending the notification comprises:

determining from at least one of the first image and the second image, whether the item is a flat or a package and providing information specifying whether the item is a flat or a package.

11. The method of claim 1, wherein each of the first image and the second image further includes postage of the item.

12. The method of claim 1, wherein the notification further includes a location of the item and a date that the item was at the location.

13. The method of claim 1, further comprising sending the first image or the second image at one or more predetermined times during the first and the second sorting operations.

14. The method of claim 1, further comprising sending the first image during the first sorting operation.

15. The method of claim 1, further comprising sending one or more images of the item during a final sorting operation performed on the item.

16. A method comprising:

receiving an indication of an address for an addressee, communication channel information, and notification information;

storing the communication channel information and the notification information based on the address;

performing a first sorting operation on a mail piece addressed to the address;

during the first sorting operation:

capturing a first image of information available from a visual inspection of the mail piece, the first image including the address, based on the first image, recognizing the address and causing a barcode to be applied to the mail piece, the barcode comprising an indication of the address, and storing the first image in a database indexed by the address;

performing a second sorting operation on the mail piece;

during the second sorting operation:

capturing a second image of the information available from the visual inspection of the mail piece, the second image including the address and the barcode, based on the second image, decoding the barcode to determine the address, and storing the second image in the database indexed by the address;

retrieving the stored communication channel information and the stored notification information based on the address;

determining, based on the retrieved notification information, that the addressee has requested to receive image notifications of the mail piece;

sending the first image and the second image to the addressee based on the retrieved communication channel information; and discarding the first image and the second image prior to a delivery of the mail piece.

17. The method of claim 16, wherein:

the communication channel information includes an email address; and sending the first image and the second image to the addressee based on the retrieved communication channel information includes emailing the first image and the second image to the addressee.

18. The method of claim 16, wherein storing the communication channel information based on the address includes:

storing the communication channel information in a database, indexed by the address.

19. A system comprising:

a processor; and a memory storing instructions that are executed by the processor to perform a method comprising:

during a first sorting operation on an item having an address for an addressee:

capturing a first image of information available from a visual inspection of the item, the first image including the address, based on the first image, recognizing the address and causing a barcode to be applied to the item, the barcode comprising an indication of the address, and storing the first image in a database indexed by the address;

performing a second sorting operation on the item;

during the second sorting operation:

capturing a second image of the information available from the visual inspection of the item, the second image including the address and the barcode, based on the second image, decoding the barcode to determine the address, and storing the second image in the database indexed by the address;

based on the address, determining, from the database, a communication channel linked to the address;

sending a notification for the item via the communication channel; and discarding the first image and the second image prior to a delivery of the item.

20. The system of claim 19, wherein sending the notification comprises:

determining from at least one of the first image and the second image, whether the item is a flat or a package and providing information specifying whether the item is a flat or a package.

21. The system of claim 19, wherein each of the first image and the second image further includes postage of the item.

22. The system of claim 19, wherein the notification further includes a location of the item and a date that the item was at the location.

23. The system of claim 19, the method further comprising:

sending the first image or the second image at one or more predetermined times during the first and the second sorting operations.

24. The system of claim 19, the method further comprising:

sending the first image during the first sorting operation.

25. The system of claim 19, the method further comprising:

sending one or more images of the item during a final sorting operation performed on the item.

26. A system comprising:

a processor; and a memory storing instructions that are executed by the processor to perform a method comprising:

receiving an indication of an address for an addressee, communication channel information, and notification information;

storing the communication channel information and the notification information based on the address;

performing a first sorting operation on an item addressed to the address;

during the first sorting operation:

capturing a first image of information available from a visual inspection of the item, the first image including the address, based on the first image, recognizing the address and causing a barcode to be applied to the item, the barcode comprising an indication of the address, and storing the first image in a database indexed by the address;

performing a second sorting operation on the item;

during the second sorting operation:

based on the first image, recognizing the address and capturing a second image of the information available from the visual inspection of the item, the second image including the address and the barcode, based on the second image, decoding the barcode to determine the address, and storing the second image in the database indexed by the address;

retrieving the stored communication channel information and the stored notification information based on the address;

determining, based on the retrieved notification information, that the addressee has requested to receive image notifications of the item;

sending the first image and the second image to the addressee based on the retrieved communication channel information; and discarding the first image and the second image prior to a delivery of the item.

27. A method, comprising:

performing a first sorting operation on an item having an address for an addressee;

during the first sorting operation:

capturing a first image of information available from a visual inspection of the item, the first image including the address, based on the first image, recognizing the address and causing a barcode to be applied to the item, the barcode comprising an indication of the address, encoding the first image as a first digital file, and storing the first digital file in a database indexed by the address;

performing a second sorting operation on the item;

during the second sorting operation:

capturing a second image of the information available from the visual inspection of the item, the second image including the address and the barcode, based on the second image, decoding the barcode to determine the address, and encoding the second image as a second digital file;

determining an electronic mail address for the addressee using the address from the item;

sending the first and the second digital files to the electronic mail address for the addressee; and discarding the first and the second digital files prior to a delivery of the item.

28. A method comprising:

performing a first sorting operation on an item having an address for an addressee;

during the first sorting operation:

capturing a first image of information available from a visual inspection of the item, the first image including the address, based on the first image, recognizing the address and causing a barcode to be applied to the item, the barcode comprising an indication of the address, and encoding the first image as a first digital file;

performing a second sorting operation on the item;

during the second sorting operation:

capturing a second image of the information available from the visual inspection of the item, the second image including the address and the barcode, based on the second image, decoding the barcode to determine the address, and encoding the second image as a second digital file;

determining an electronic mail address for the addressee using the address from the item;

determining that the addressee has requested to receive image notifications of items;

sending an electronic message to the electronic mail address for the addressee, wherein the electronic message includes a link to a server storing the first and the second digital files; and discarding the first and the second digital files prior to a delivery of the item.

* * * * *